United States Patent
Shichino

(10) Patent No.: US 12,088,120 B2
(45) Date of Patent: Sep. 10, 2024

(54) POWER TRANSMITTING APPARATUS HAVING NFC TAG DETECTION FUNCTION, CONTROL METHODS THEREFOR, AND STORAGE MEDIUM

(71) Applicant: CANON KABUSHIKI KAISHA, Tokyo (JP)

(72) Inventor: Takahiro Shichino, Tokyo (JP)

(73) Assignee: Canon Kabushiki Kaisha, Tokyo (JP)

(*) Notice: Subject to any disclaimer, the term of this patent is extended or adjusted under 35 U.S.C. 154(b) by 3 days.

(21) Appl. No.: 17/509,499

(22) Filed: Oct. 25, 2021

(65) Prior Publication Data

US 2022/0045553 A1 Feb. 10, 2022

Related U.S. Application Data

(63) Continuation of application No. PCT/JP2020/008408, filed on Feb. 28, 2020.

(30) Foreign Application Priority Data

Apr. 26, 2019 (JP) ................................ 2019-085795

(51) Int. Cl.
*H02J 50/60* (2016.01)
*H02J 50/12* (2016.01)
(Continued)

(52) U.S. Cl.
CPC ............. *H02J 50/60* (2016.02); *H02J 50/12* (2016.02); *H02J 50/80* (2016.02); *H04B 5/26* (2024.01); *H04B 5/79* (2024.01)

(58) Field of Classification Search
None
See application file for complete search history.

(56) References Cited

U.S. PATENT DOCUMENTS

2014/0159653 A1* 6/2014 Von Novak .......... H04B 5/0031
320/108
2016/0099604 A1* 4/2016 Von Novak, III ...... H02J 50/12
320/108

(Continued)

FOREIGN PATENT DOCUMENTS

CN 104734278 A 6/2015
CN 108604817 A 9/2018

(Continued)

*Primary Examiner* — Adi Amrany
(74) *Attorney, Agent, or Firm* — Canon U.S.A., Inc., IP Division

(57) ABSTRACT

A power receiving apparatus that wirelessly receives power from a power transmitting apparatus comprises a first communication unit communicating with the power transmitting apparatus, a second control unit executing detection of another apparatus capable of performing short-range wireless communication and a first control unit controlling whether to execute the detection by the second control unit. The first control unit, in a case where it is determined that the power transmitting apparatus does not have the detection function, controls to execute the detection by the second control unit when a detection status of another apparatus by the second control unit is undetermined, and not to execute the detection by the second control unit when the detection status is determined. The first communication unit transmits, to the power transmitting apparatus, a signal corresponding to a result of the detection by the second control unit.

7 Claims, 6 Drawing Sheets

(51) Int. Cl.
  *H02J 50/80* (2016.01)
  *H04B 5/26* (2024.01)
  *H04B 5/79* (2024.01)

(56) References Cited

U.S. PATENT DOCUMENTS

| | | | | |
|---|---|---|---|---|
| 2016/0172893 A1* | 6/2016 | Yoon | ................ | H04B 5/0031 320/108 |
| 2017/0085297 A1* | 3/2017 | Gao | ................ | H02J 50/20 |
| 2017/0294798 A1* | 10/2017 | Yuk | ................ | H04B 5/0037 |
| 2017/0331317 A1* | 11/2017 | Wheeland | ................ | H02J 50/80 |
| 2018/0225486 A1* | 8/2018 | Teruyama | ................ | G06K 19/0723 |
| 2019/0148966 A1* | 5/2019 | Choi | ................ | H02J 50/80 307/104 |
| 2019/0148980 A1* | 5/2019 | Kim | ................ | H02J 50/05 307/104 |
| 2019/0305826 A1 | 10/2019 | Park | | |
| 2021/0281125 A1* | 9/2021 | Sato | ................ | H02J 7/00034 |

FOREIGN PATENT DOCUMENTS

| | | |
|---|---|---|
| CN | 109121446 A | 1/2019 |
| JP | 2014-075858 A | 4/2014 |
| JP | 2014-093818 A | 5/2014 |
| JP | 2016529862 A | 9/2016 |
| JP | 2017-184488 A | 10/2017 |
| JP | 2017184383 A | 10/2017 |
| JP | 2018082563 A | 5/2018 |
| JP | 2018-133855 A | 8/2018 |
| JP | 2019-062595 A | 4/2019 |
| KR | 20180062653 A | 6/2018 |
| WO | 2015007518 A1 | 1/2015 |
| WO | 2017/169442 A | 10/2017 |
| WO | 2018056633 A1 | 3/2018 |

* cited by examiner

FIG. 4

| bit0 | 0 | POLLING HAS NOT BEEN EXECUTED BASED ON POLLING INSTRUCTION |
|---|---|---|
| | 1 | POLLING HAS BEEN EXECUTED BASED ON POLLING INSTRUCTION |
| bit1 | 0 | NFC TAG HAS NOT BEEN DETECTED |
| | 1 | NFC TAG HAS BEEN DETECTED |

POWER TRANSMITTING APPARATUS HAVING NFC TAG DETECTION FUNCTION, CONTROL METHODS THEREFOR, AND STORAGE MEDIUM

CROSS-REFERENCE TO RELATED APPLICATIONS

This application is a Continuation of International Patent Application No. PCT/JP2020/008408, filed Feb. 28, 2020, which claims the benefit of Japanese Patent Application No. 2019-085795, filed Apr. 26, 2019, both of which are hereby incorporated by reference herein in their entireties.

BACKGROUND

Technical Field

The present disclosure relates to a power receiving apparatus, a power transmitting apparatus, control methods therefor, and a wireless power transmission system.

Background Art

Technology development of wireless power transmission systems has widely been conducted. As a standard for a power transmitting apparatus and a power receiving apparatus forming a wireless power transmission system, there is provided a standard (to be referred to as the WPC standard hereinafter) defined by WPC that is the standardization organization of contactless charge standards. Note that WPC is an abbreviation for Wireless Power Consortium. On the other hand, as a standard for short-range wireless communication, there is known the NFC standard. NFC is an abbreviation for Near Field Communication.

In the NFC standard, transmission of a message for detecting a communication partner apparatus by transmitting a carrier wave and modulating the carrier wave is called polling. Polling is transmitted by an apparatus having a reader/writer function complying with the NFC standard. An apparatus having a function of receiving polling transmitted by the reader/writer and responding to the polling by load-modulating the carrier wave transmitted by the reader writer is called an NFC tag.

PTL 1 (further described below) describes an arrangement in which a power receiving apparatus complying with the WPC standard and having the NFC tag function transmits a response to polling performed by a power transmitting apparatus complying with the WPC standard and having the reader/writer function complying with the NFC standard. PTL 1 limits wireless power when the power transmitting apparatus performs NFC communication (polling and response) in order to avoid a failure of NFC communication caused when wireless power and NFC communication interfere with each other.

When wireless power transmission is executed while an NFC tag is close to a power transmitting apparatus, the NFC tag may be damaged by transmission power output from the power transmitting apparatus. If the power transmitting apparatus has the reader/writer function as in PTL 1, damage to the NFC tag can be avoided when the power transmitting apparatus detects the existence of the NFC tag by polling and limits power to be transmitted. Similarly, if a power receiving apparatus has the reader/writer function, even if the power transmitting apparatus has no reader/writer function, it is possible to appropriately control wireless power transmission in accordance with the presence/absence of the NFC tag.

CITATION LIST

Patent Literature

PTL 1: Japanese Patent Laid-Open No. 2014-093818

SUMMARY

A cooperative operation between the power receiving apparatus and the power transmitting apparatus for avoiding damage to the NFC tag when the reader/writer function is implemented in the power receiving apparatus has not been proposed until now. The present disclosure provides a technique associated with a cooperative operation between a power receiving apparatus and a power transmitting apparatus in a wireless power transmission system when a reader/writer is implemented in the power receiving apparatus.

According to one aspect of the present disclosure, there is provided a power receiving apparatus for wirelessly receiving power from a power transmitting apparatus, comprising: a communication unit configured to communicate with the power transmitting apparatus; a detection unit configured to execute detection of another apparatus capable of performing short-range wireless communication; a determination unit configured to determine whether the power transmitting apparatus has a detection function of detecting another apparatus capable of performing short-range wireless communication; and a control unit configured to control whether to execute the detection by the detection unit, wherein, in a case where the determination unit determines that the power transmitting apparatus does not have the detection function, the control unit controls to execute the detection by the detection unit when a detection status of another apparatus by the detection unit is undetermined, and not to execute the detection by the detection unit when the detection status by the detection unit is determined, and the communication unit transmits, to the power transmitting apparatus, a signal corresponding to a result of the detection by the detection unit.

According to another aspect of the present disclosure, there is provided a power transmitting apparatus for wirelessly transmitting power to a power receiving apparatus, comprising: a communication unit configured to communicate with the power receiving apparatus; a detection unit configured to detect another apparatus having a function capable of performing short-range wireless communication; and a notification unit configured to notify, using the communication unit, the power receiving apparatus of information representing that the detection unit is provided and information representing a detection status of another apparatus by the detection unit in response to an inquiry from the power receiving apparatus.

According to another aspect of the present disclosure, there is provided a wireless power transmission system comprising: a power transmitting apparatus configured to wirelessly transmit power; a power receiving apparatus configured to wirelessly receive power from the power transmitting apparatus; and a communication unit configured to perform communication between the power transmitting apparatus and the power receiving apparatus, the power receiving apparatus including a detection unit configured to execute detection of another apparatus capable of performing short-range wireless communication, a determination unit configured to determine whether the power transmitting apparatus has a detection function of detecting another apparatus capable of performing short-range wireless communication, and a control unit configured to control whether to execute the detection by the detection unit, wherein in a case where the determination unit determines that the power transmitting apparatus does not have the detection function, the control unit controls to execute the detection by the detection unit when a detection status of another apparatus by the detection unit is undetermined, and not to execute the detection by the detection unit when the detection status by the detection unit is determined, and the communication unit transmits, to the power transmitting apparatus, a signal corresponding to a result of the detection by the detection unit.

According to another aspect of the present disclosure, there is provided a control method for a power receiving apparatus that wirelessly receives power from a power transmitting apparatus and includes a communication unit configured to communicate with the power transmitting apparatus, the method comprising: executing detection of another apparatus capable of performing short-range wireless communication; determining whether the power transmitting apparatus has a detection function of detecting another apparatus capable of performing short-range wireless communication; and controlling whether to execute the detection of another apparatus, wherein, in the controlling, in a case where it is determined in the determining that the power transmitting apparatus does not have the detection function, the detection of another apparatus is controlled to be executed when a detection status of another apparatus by the detection is undetermined, and the detection is controlled not to be executed when the detection status is determined, and the communication unit transmits, to the power transmitting apparatus, a signal corresponding to a result of the detection.

According to another aspect of the present disclosure, there is provided a control method for a power transmitting apparatus that wirelessly transmits power to a power receiving apparatus and includes a communication unit configured to communicate with the power receiving apparatus, the method comprising: detecting another apparatus having a function capable of performing short-range wireless communication; and notifying, using the communication unit, the power receiving apparatus of information representing that a function of executing the detecting is provided and information representing a detection status of another apparatus in the detecting in response to an inquiry from the power receiving apparatus.

According to another aspect of the present disclosure, there is provided a non-transitory computer-readable storage medium storing a program for causing a computer to execute a control method for a power receiving apparatus that wirelessly receives power from a power transmitting apparatus and includes a communication unit configured to communicate with the power transmitting apparatus, the method comprising: executing detection of another apparatus capable of performing short-range wireless communication; determining whether the power transmitting apparatus has a detection function of detecting another apparatus capable of performing short-range wireless communication; and controlling whether to execute the detection of another apparatus, wherein, in the controlling, in a case where it is determined in the determining that the power transmitting apparatus does not have the detection function, the detection of another apparatus is controlled to be executed when a detection status of another apparatus by the detection is undetermined, and the detection is controlled not to be executed when the detection status is determined, and the communication unit transmits, to the power transmitting apparatus, a signal corresponding to a result of the detection.

According to another aspect of the present disclosure, there is provided a non-transitory computer-readable storage medium storing a program for causing a computer to execute a control method for a power transmitting apparatus that wirelessly transmits power to a power receiving apparatus and includes a communication unit configured to communicate with the power receiving apparatus, the method comprising: detecting another apparatus having a function capable of performing short-range wireless communication; and notifying, using the communication unit, the power receiving apparatus of information representing that a function of executing the detecting is provided and information representing a detection status of another apparatus in the detecting in response to an inquiry from the power receiving apparatus.

Further features of the present disclosure will become apparent from the following description of exemplary embodiments with reference to the attached drawings.

BRIEF DESCRIPTION OF THE DRAWINGS

The accompanying drawings, which are incorporated in and constitute a part of the specification, illustrate embodiments of the disclosure and, together with the description, serve to explain principles of the disclosure.

FIG. 4 is a conceptual view of communication concerning NFC between a first control unit and a second control unit;

DESCRIPTION OF THE EMBODIMENTS

Figure 1A:
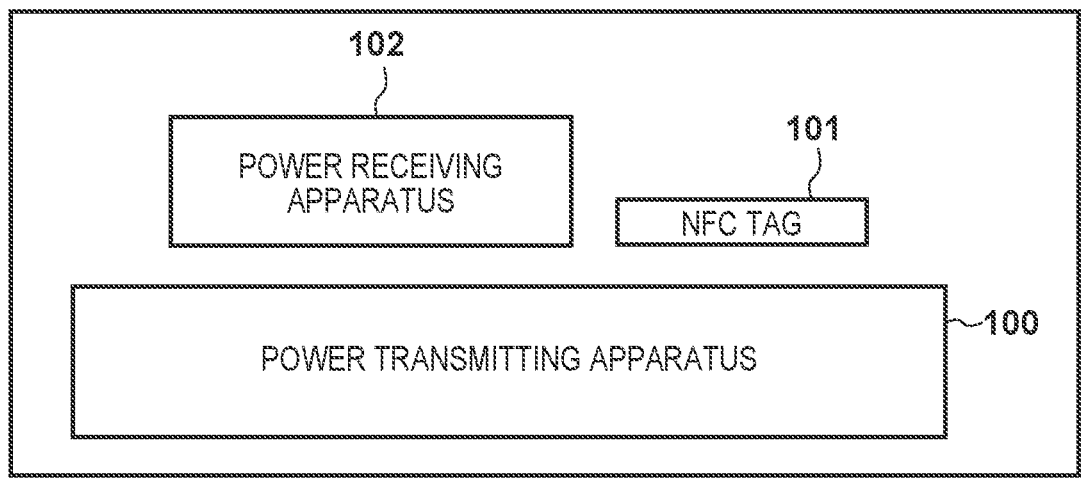
FIG. 1A is a view showing an example of a system configuration according to an embodiment.

Hereinafter, embodiments will be described in detail with reference to the attached drawings. Note, the following embodiments are not intended to limit the scope of the invention. Multiple features are described in the embodiments, but limitation is not made to an invention that requires all such features, and multiple such features may be combined as appropriate. Furthermore, in the attached drawings, the same reference numerals are given to the same or similar configurations, and redundant description thereof is omitted.

FIG. 1A is a view showing an example of the configuration of a wireless power transmission system according to an embodiment. A power receiving apparatus 102 complying with the WPC (Wireless Power Consortium) standard is placed on a power transmitting apparatus 100 complying with the WPC standard. The power receiving apparatus 102 receives power wirelessly transmitted from the power transmitting apparatus 100. The power transmitting apparatus 100 and the power receiving apparatus 102 of this embodiment comply with the WPC standard, and each have a function defined in the WPC standard v1.2.3. The power transmitting apparatus 100 can detect the power receiving apparatus 102. The power receiving apparatus 102 can supply, to a load (for example, a chargeable battery) connected to itself, power received from the power transmitting apparatus 100. When an NFC (Near Field Communication) tag 101 is close to the power transmitting apparatus 100, it can be influenced by wireless power transmitted by the power transmitting apparatus 100.

Figure 1B:
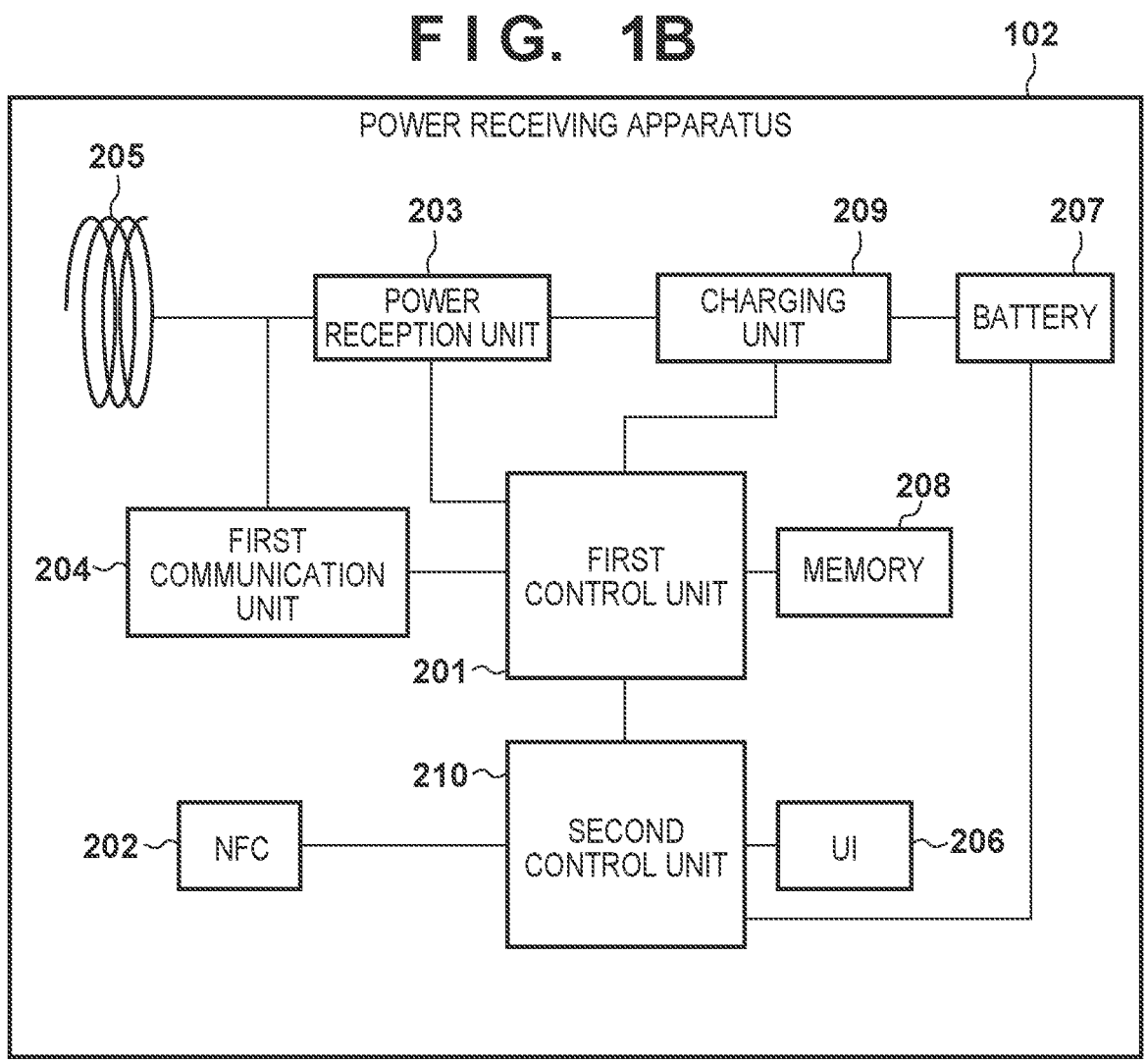
FIG. 1B is a block diagram showing an example of the arrangement of a power receiving apparatus according to the embodiment.

FIG. 1B is a block diagram showing an example of the arrangement of the power receiving apparatus 102 according to the embodiment. The power receiving apparatus 102 implements an NFC reader/writer. This embodiment assumes that the power transmitting apparatus 100 and the power receiving apparatus 102 comply with the WPC standard. However, the present disclosure is not limited to this and these apparatuses may comply with another wireless power transmission standard.

A first control unit 201 includes, for example, one or a plurality of processors, and controls the overall power receiving apparatus 102. An example of the processor is a CPU (Central Processing Unit) that implements various functions by executing predetermined programs. A power reception unit 203 receives, via a power receiving coil 205, wireless power transmitted by the power transmitting apparatus 100. The power reception unit 203 converts an AC voltage/AC current received by the power receiving coil 205 into a DC voltage/DC current, and supplies it to a charging unit 209. Furthermore, the DC voltage/DC current output from the power reception unit 203 is also used as power to drive the first control unit 201.

A first communication unit 204 wirelessly communicates with the power transmitting apparatus 100 under the control of the first control unit 201. In this embodiment, the first communication unit 204 performs load modulation to superimpose a signal on an electromagnetic wave of wireless power received via the power receiving coil 205, and transmits the signal to the power transmitting apparatus 100. The load modulation may be frequency modulation or amplitude modulation. A memory 208 stores a calculation result of the first control unit 201. Note that the first communication unit 204 may perform communication complying with the Bluetooth® Low Energy (to be referred to as "BLE" hereinafter) standard. Furthermore, the first communication unit 204 may perform communication by a communication method such as ZigBee® or wireless LAN (for example, Wi-Fi®) complying with the IEEE802.11 standard series.

An NFC 202 that serves as the second communication unit and is an example of short-range wireless communication is an NFC reader/writer, and is controlled by a program implemented in a second control unit 210. The NFC 202 is formed by an NFC coil and a circuit complying with the NFC standard. The second control unit 210 for controlling the NFC 202 has a function of transmitting/receiving, to/from the first control unit 201, information concerning the operation of the NFC 202. The NFC 202 can detect another apparatus (for example, an NFC tag) having a function capable of communicating with the NFC 202. Furthermore, the second control unit 210 and the NFC 202 operate by receiving power supply from a battery 207.

A UI 206 is the user interface of the power receiving apparatus 102 and has a function of notifying the user of various kinds of information. This embodiment assumes that the UI 206 is controlled by the second control unit 210 but the present disclosure is not limited to this. For example, the UI 206 may be controlled by the first control unit 201 or by another control unit (not shown). The charging unit 209 supplies, to the battery 207, power supplied from the power reception unit 203, thereby controlling charging of the battery 207.

Note that FIG. 1B shows the first communication unit 204, the power reception unit 203, and the first control unit 201 as separated units but some or all of these units may be packaged and implemented as one part. In addition, the NFC 202 and the second control unit 210 are shown as separated units but may be packaged and implemented as one part. That is, each of the above-described constituent elements is not restricted in terms of a form for implementing it and the like as long as it can implement a function (to be described later).

Figure 2:
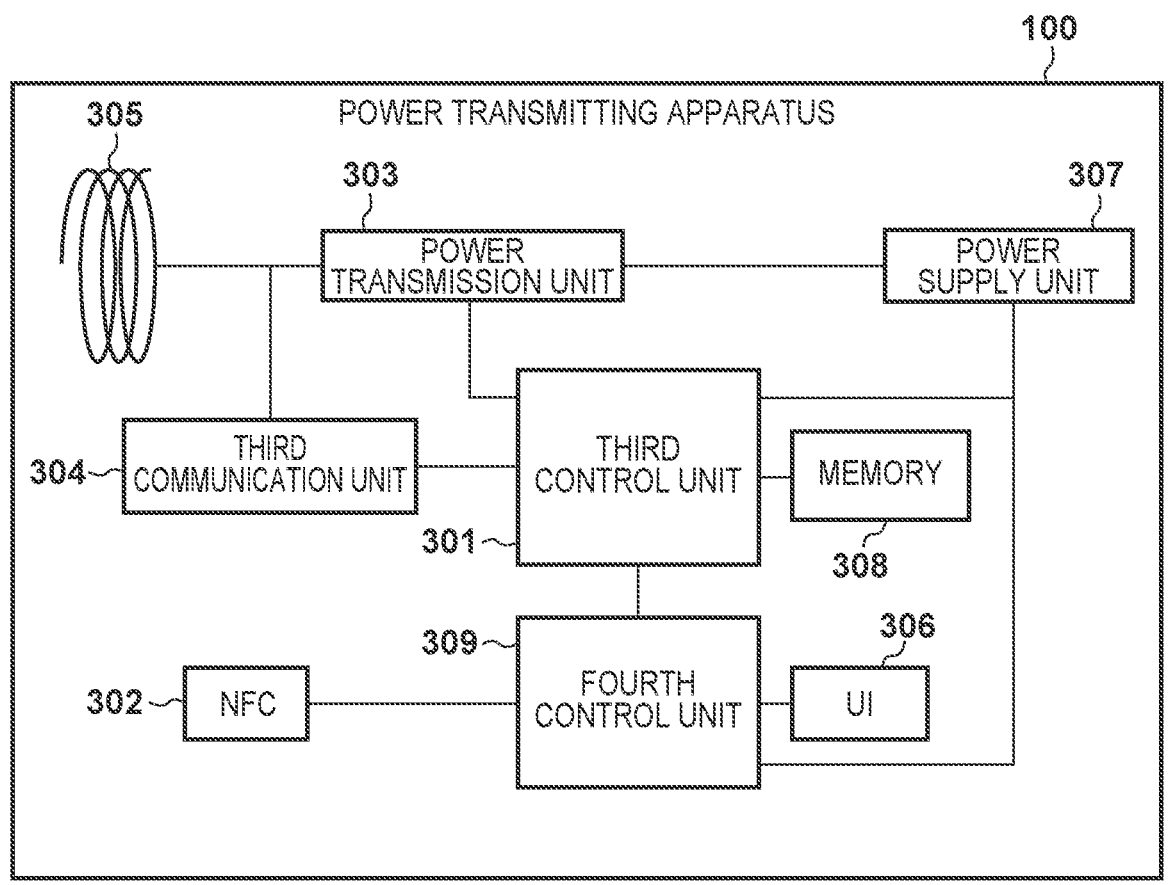
FIG. 2 is a block diagram showing an example of the arrangement of a power transmitting apparatus according to the embodiment.

FIG. 2 is a block diagram showing an example of the arrangement of the power transmitting apparatus 100 according to the embodiment. Referring to FIG. 2, a third control unit 301 includes one or a plurality of processors, and controls the overall power transmitting apparatus 100. An example of the processor is a CPU that implements various functions by executing programs. A power supply unit 307 uses power from a battery or an external power supply (for example, a commercial power supply) to supply power that is used by at least the third control unit 301, a fourth control unit 309, and a power transmission unit 303 to operate.

The power transmission unit 303 generates an AC voltage/AC current to be transmitted to the power receiving apparatus 102 via a power transmitting coil 305. More specifically, the power transmission unit 303 converts a DC voltage supplied from the power supply unit 307 into an AC voltage by a switching circuit with a half bridge or full bridge structure using FETs (Field Effect Transistors). The power transmission unit 303 includes a gate driver that controls ON/OFF of the FETs. The power transmission unit 303 has capability of supplying power of 15 watts to the charging unit 209 of the power receiving apparatus 102 adaptable to the WPC standard.

A third communication unit 304 wirelessly communicates with the power receiving apparatus 102 under the control of the third control unit 301. In this embodiment, the third communication unit 304 performs load modulation to superimpose a signal on an electromagnetic wave of power wirelessly transmitted via the power transmitting coil 305, and transmits the signal to the power receiving apparatus 102. Note that the third communication unit 304 may perform communication complying with the Bluetooth® Low Energy (to be referred to as "BLE" hereinafter) standard. Furthermore, the third communication unit 304 may perform communication by a communication method such as ZigBee® or wireless LAN (for example, Wi-Fi®) complying with the IEEE802.11 standard series.

A memory 308 stores a calculation result of the third control unit 301. An NFC 302 is an NFC reader/writer. The fourth control unit 309 controls the NFC 302. The fourth control unit 309 has a function of transmitting/receiving information concerning the operation of the NFC 302 to/from the second control unit 210 of the power receiving apparatus 102. A UI 306 is the user interface of the power transmitting apparatus 100, and has a function of notifying the user of various kinds of information.

The operation of the wireless power transmission system with the above arrangement according to this embodiment will be described below.

As described above, the power transmitting apparatus 100 and the power receiving apparatus 102 each have the NFC reader/writer function. If the NFC tag 101 exists near the power transmitting apparatus 100 and the power receiving apparatus 102, the NFC tag 101 is influenced by wireless power transmission based on the WPC standard. Therefore, the power transmitting apparatus 100 and the power receiving apparatus 102 perform a cooperative operation so the NFC tag 101 is not influenced by wireless power transmission. More specifically, the power transmitting apparatus 100 and the power receiving apparatus 102 detect the existence of the NFC tag 101 by polling before wireless power transmission/reception, and decide, in accordance with the detection result, whether it is possible to execute wireless power transmission.

Furthermore, if the reader/writer functions of the power transmitting apparatus 100 and the power receiving apparatus 102 perform polling at the same time, the pollings interfere with each other, and thus the NFC tag 101 may not be able to receive polling correctly, and not be able to respond to the polling. In this case, the power transmitting apparatus 100 and the power receiving apparatus 102 cannot detect the NFC tag 101 even if it exists nearby. As a result, even though the NFC tag 101 exists nearby, wireless power transmission between the power transmitting apparatus 100 and the power receiving apparatus 102 may start, thereby damaging the NFC tag 101. To solve this problem, it is important to detect the NFC tag 101 by a cooperative operation between the power transmitting apparatus 100 and the power receiving apparatus 102. More specifically, the power transmitting apparatus 100 and the power receiving apparatus 102 perform the following processing. Note that the reader/writer is an example of a detection function for detecting the NFC tag.

(1) If the power transmitting apparatus includes no reader/writer, the power receiving apparatus 102 operates its reader/writer to detect the NFC tag.

(2) If the power transmitting apparatus includes the reader/writer but has executed no polling processing, the power receiving apparatus 102 performs polling processing.

(3) If the power transmitting apparatus includes the reader/writer, and has executed polling processing, the power receiving apparatus 102 performs no polling processing.

The cooperative operations of (1) to (3) above can solve the problem that the polling of the power transmitting apparatus 100 and that of the power receiving apparatus 102 interfere with each other to make it impossible to detect the NFC tag 101 correctly. Each of the cooperative operations of [1] to [3] will be described below with reference to a flowchart shown in FIG. 3.

Figure 3:
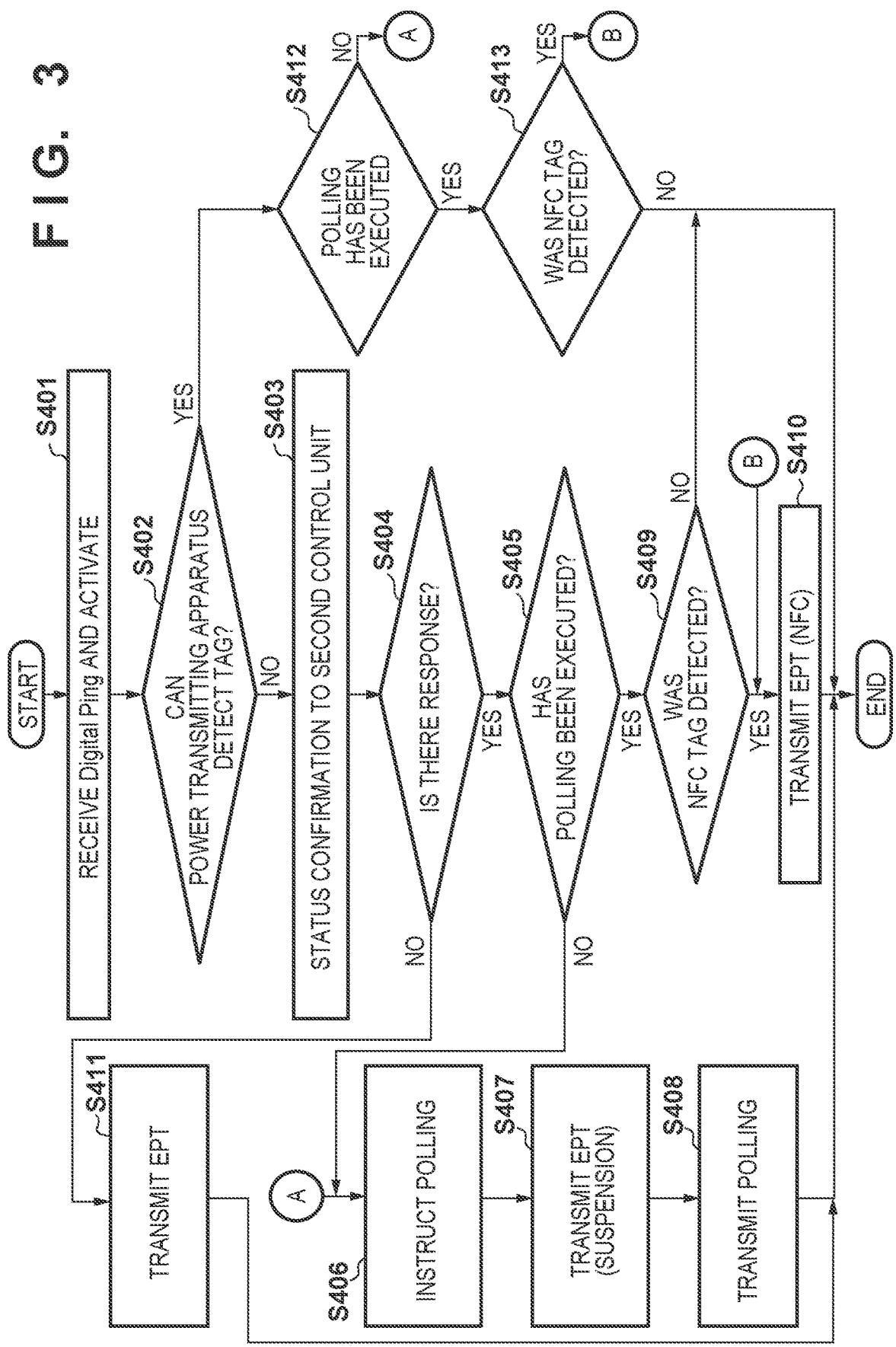
FIG. 3 is a flowchart illustrating an operation performed by a control unit of the power receiving apparatus.
Figure 5:
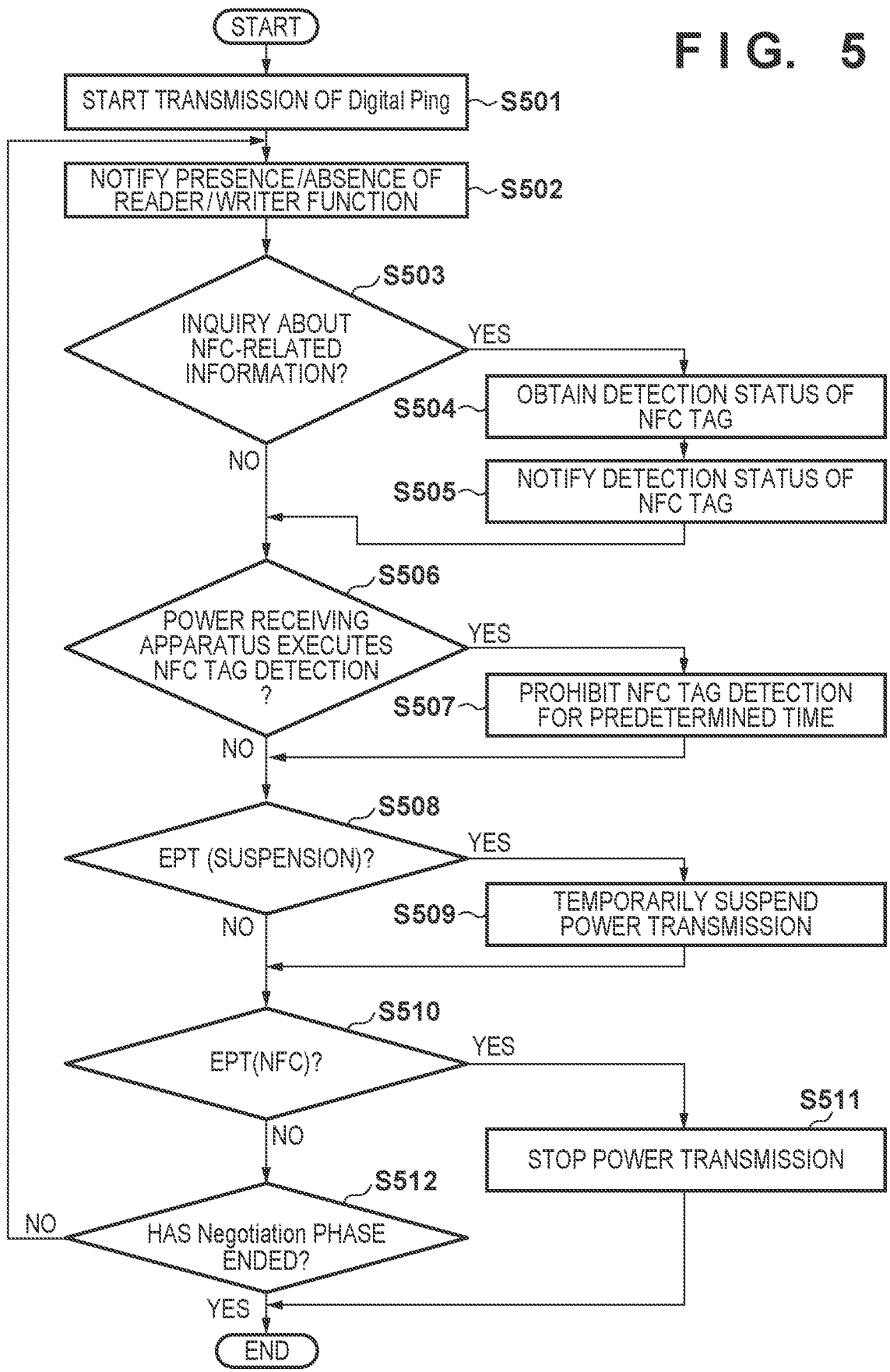
FIG. 5 is a flowchart illustrating an operation performed by a control unit of the power transmitting apparatus.

FIG. 3 is a flowchart illustrating processing performed by the first control unit 201 of the power receiving apparatus 102. FIG. 5 is a flowchart illustrating processing performed by the third control unit 301 of the power transmitting apparatus 100. The operations of the power receiving apparatus 102 and the power transmitting apparatus 100 according to this embodiment will be described with reference to the flowcharts of FIGS. 3 and 5. Note that steps S502 to S512 of FIG. 5 show part of processing (processing until NO is determined in step S512) executed by the power transmitting apparatus 100 during a negotiation phase. First, among the above-described three cooperative operations, (1) will be described. (1) corresponds to a case in which the power transmitting apparatus 100 includes no reader/writer (in FIG. 2, the power transmitting apparatus 100 includes neither the NFC 302 nor the fourth control unit 309). In this case, the power transmitting apparatus 100 sends, in step S502, a notification that it has no reader/writer function, and has no function of executing processes in steps S503 to S505 of FIG. 5.

The power transmitting apparatus 100 transmits a digital ping defined by the WPC standard (step S501). When the power receiving apparatus 102 receives the digital ping from the power transmitting apparatus 100, the first control unit 201 is activated (step S401). At this time, the magnitude of power of the digital ping is at least power sufficient to activate the first control unit 201 of the power receiving apparatus 102 existing near the power transmitting coil 305.

The first control unit 201 activated by the digital ping controls the first communication unit 204 to transmit, to the power transmitting apparatus 100, a signal strength packet representing the magnitude of the received digital ping. The signal strength packet is a packet defined by the WPC standard, and is transmitted to the power transmitting apparatus 100 via the power receiving coil 205.

Next, the first control unit 201 controls the first communication unit 204 to transmit an ID packet including the identification information of itself to the power transmitting apparatus 100. The ID packet is a packet defined by the WPC standard, and includes version information of the WPC standard with which the first control unit 201 complies, and the individual identification number of the first control unit 201. Furthermore, the first control unit 201 controls the first communication unit 204 to transmit a configuration packet to the power transmitting apparatus 100. The configuration packet is a packet defined by the WPC standard, and includes information concerning a function supported by the first control unit 201.

The first control unit 201 receives, as a response to the configuration packet, an ACK from the third control unit 301 of the power transmitting apparatus 100. The ACK is a signal defined by the WPC standard, and represents that the power transmitting apparatus 100 has correctly received the information included in the configuration packet and acknowledged the contents of the information. Upon receiving the ACK from the power transmitting apparatus 100, the first control unit 201 transitions to the negotiation phase. Upon transmitting the ACK, the third control unit 301 transitions to the negotiation phase. In the negotiation phase, a negotiation concerning wireless power transmission is executed between the power receiving apparatus 102 and the power transmitting apparatus 100.

Next, in the negotiation phase, the first control unit 201 inquires of the power transmitting apparatus 100 whether the power transmitting apparatus 100 has the reader/writer function (detection function) of detecting the NFC tag (step S402). For the inquiry, among general request packets defined by the WPC standard and representing inquiries to the power transmitting apparatus, a general request packet (capability) can be used. The general request packet (capability) is a packet used to inquire about capability information of the power transmitting apparatus. Note that a packet usable to inquire about the presence/absence of the NFC tag detection function is not limited to the above-described one. For example, among packets defined by the WPC standard, a reserved packet or proprietary packet whose packet type is undefined may be defined as an inquiry about the presence/absence of the NFC tag detection function and used. Alternatively, among specific requests and general requests defined by the WPC standard, a reserved packet or proprietary packet whose packet type is undefined may be used.

In response to the above inquiry from the power receiving apparatus 102, the third control unit 301 of the power transmitting apparatus 100 sends a notification of a packet representing whether the power transmitting apparatus 100 has the reader/writer function (step S502). In this example, the power transmitting apparatus 100 sends a notification that it has no reader/writer function. The first control unit 201 that executes the above determination processing in step S402 is an example of a component for communicating with the power transmitting apparatus 100 using the first communication unit 204 and determining whether the power transmitting apparatus 100 has a function of detecting the NFC tag (another apparatus). Note that in this embodiment, a general request packet (capability) and a capability packet are used for the above-described inquiry and response about the function, as will be described later with reference to FIG. 6. If the first control unit 201 receives, from the power transmitting apparatus 100, a response representing that the power transmitting apparatus 100 has no NFC tag detection function (no NFC reader/writer) (NO in step S402), the process advances to step S403. If the first control unit 201 thus determines that the power transmitting apparatus 100 has no NFC tag detection function, the first control unit 201 inquires of the second control unit 210 whether NFC tag detection has been performed and about the result of the detection processing (step S403). This inquiry will be referred to as status confirmation hereinafter.

A response to the above-described status confirmation from the second control unit 210 will now be described with reference to FIG. 4. FIG. 4 is a table showing contents of communication for status confirmation concerning detection of the NFC tag between the first control unit 201 and the second control unit 210. A response to the status confirmation inquiry is formed by 2 bits. Bit0 represents whether polling has been performed. In this example, the polling is polling executed via the NFC 202 and an NFC coil (not shown) based on a polling instruction from the first control unit 201. If bit0 is "0", this represents that the second control unit 210 has not executed polling based on an instruction from the first control unit 201. If bit0 is "1", this represents that the second control unit 210 has executed polling in response to an instruction from the first control unit 201. Furthermore, bit1 represents whether the NFC tag has been detected as a result of executing the above-described polling. If bit1 is "0", this represents that the second control unit 210 has detected no NFC tag. If bit1 is "1", this represents that the second control unit 210 has detected the NFC tag.

Assume here that the first control unit 201 is notified of, as a response to the status confirmation, "00" representing that the second control unit 210 has not executed polling processing and no NFC tag has been detected, that is, the detection status of the NFC tag is unconfirmed. Note that if bit0 is "0", polling has not been executed, and it may thus be determined that the detection status of the NFC tag is unconfirmed regardless of the status of bit1. When the first control unit 201 receives, from the second control unit 210, the response "00", representing that polling has not been executed, to the status confirmation inquiry, it instructs the second control unit 210 to execute polling (YES in step S404, NO in step S405, and step S406). As described above, if it is determined that the power transmitting apparatus 100 has no function of detecting the NFC tag and the detection status of the NFC tag by the NFC 202 is undetermined, the first control unit 201 executes NFC tag detection using the second control unit 210 and the NFC 202.

At this time, when executing NFC tag detection using the NFC 202, the first control unit 201 requests, by communication using the first communication unit 204, the power transmitting apparatus 100 to limit power transmission by the power transmitting apparatus 100 for a predetermined time. For example, the first control unit 201 temporarily suspends transmission of the digital ping so polling is not influenced by the digital ping, and transmits, to the power transmitting apparatus 100, data for requesting to restart power transmission after the predetermined time (step S407). For the temporary suspension request of power transmission, an end power transmission (EPT) packet for requesting a stop of power transmission, defined by the WPC standard, can be used. The first control unit 201 transmits, to the power transmitting apparatus 100, EPT added with an information element representing the temporary suspension of power transmission.

Note that in this embodiment, the EPT packet including the information element representing temporary suspension is represented as EPT (suspension). Furthermore, the predetermined time from the suspension of power transmission to the restart of power transmission is at least longer than a time taken to transmit polling using the NFC 202 and receive a response to it after the second control unit 210 receives the polling instruction from the first control unit 201.

Upon receiving the EPT (suspension), the power transmitting apparatus 100 temporarily stops transmission of the digital ping (steps S508 and S509). This can prevent the influence of the digital ping on the polling performed by the power transmitting apparatus 100 and the response to it. Note that the temporary suspension period (the above-described predetermined time) may be preset in the power transmitting apparatus 100 or information for designating the predetermined time may be included in the EPT (suspension). If the information for designating the predetermined time is included in the EPT (suspension), the power transmitting apparatus 100 stops transmission of the digital ping for the predetermined time designated by the EPT (suspension). Upon detecting the stop of the digital ping, the second control unit 210 causes the NFC 202 to start transmission of polling, thereby executing polling processing (step S408). The second control unit 210 stores an NFC tag detection result obtained by the polling processing. After that, if the power receiving apparatus 102 receives transmission of the digital ping from the power transmitting apparatus 100, it transmits a signal according to the NFC tag detection result to the power transmitting apparatus 100. More specifically, if the power receiving apparatus 102 detects the NFC tag, it transmits, to the power transmitting apparatus 100, an EPT (NFC) packet obtained by storing, in the EPT packet, an information element representing that the NFC tag has been detected. Furthermore, if no NFC tag is detected, a signal strength packet or the like is transmitted.

Note that power transmission by the power transmitting apparatus 100 is stopped in detection of the NFC tag 101 (execution of polling) in the above example but the present disclosure is not limited to this. For example, it may be requested to limit the maximum value of transmission power to a predetermined value or less. In this case, the maximum value of the transmission power is decided within a range that does not influence polling. Furthermore, in the request, the power receiving apparatus 102 may notify the power transmitting apparatus of the maximum value of the transmission power.

Assume that as a result of the polling, a response is received from the NFC tag 101 and the second control unit 210 detects the NFC tag. The second control unit 210 stores information (NFC-related information) representing the detection status. If the above-described predetermined time elapses, the first control unit 201 is reactivated by the digital ping received again from the power transmitting apparatus 100 (step S401), and steps S402 to S405 described above are executed. In step S405, the first control unit 201 performs status confirmation concerning detection of the NFC tag with the second control unit 210, and determines whether the second control unit 210 has executed polling (the detection status of the NFC tag has been determined). Since the second control unit 210 has detected the NFC tag in response to the polling instruction of the first control unit 201, the second control unit 210 transmits, to the first control unit 201, "11" representing that polling has been executed (bit0 is "1") and the NFC tag has been detected (bit1 is "1").

Since the second control unit 210 notifies the first control unit 201 that the NFC tag has been detected, the first control unit 201 requests the power transmitting apparatus 100 to limit transmission of the digital ping (YES in steps S404, S405, and S409, and step S410). More specifically, the power receiving apparatus 102 transmits, to the power transmitting apparatus 100, an EPT (NFC) packet obtained by storing, in an EPT packet, an information element representing that the NFC tag has been detected. Upon receiving the EPT (NFC), the third control unit 301 of the power transmitting apparatus 100 stops wireless power transmission (steps S510 and S511). Note that the EPT (NFC) packet is used to stop power transmission by the power transmitting apparatus 100 in the above example but the present disclosure is not limited to this. For example, it may be requested to limit the maximum value of the transmission power to a predetermined value or less. In this case, the maximum value of power to be transmitted is decided within a range that does not damage the NFC tag. Furthermore, in the request, the power receiving apparatus 102 may notify the power transmitting apparatus of the maximum value of the transmission power.

On the other hand, if a response to the status confirmation is not received from the second control unit 210 (NO in step S404), the first control unit 201 transmits EPT to the power transmitting apparatus 100 (step S411). Upon accepting the EPT, the power transmitting apparatus 100 stops wireless power transmission. A status in which the first control unit 201 cannot receive a response to the status confirmation from the second control unit 210 can occur when, for example, the second control unit 210 stops its operation since there is no remaining battery amount. In this case, the power receiving apparatus 102 cannot confirm the presence/absence of the NFC tag. Therefore, to more reliably avoid the possibility that the NFC tag exists near the power transmitting apparatus 100 and is damaged by power transmission, the first control unit 201 stops power transmission by the power transmitting apparatus 100. Note that with respect to step S411, the power transmitting apparatus 100 may be requested to limit the maximum value of the transmission power to the predetermined value or less instead of completely stopping power transmission. This allows transmission of small power to the extent that the NFC tag is not damaged, and the battery 207 can thus be charged by the power.

Since the power receiving apparatus 102 operates, as described above, if the power transmitting apparatus 100 has no reader/writer, the power receiving apparatus 102 can detect the NFC tag by operating its reader/writer. Furthermore, in this embodiment, the NFC-related information representing whether NFC tag detection has been performed and its result is stored in the second control unit 210 that is supplied with power from the battery 207. Therefore, preferable control is implemented, as follows.

If the NFC-related information is stored in a volatile memory (not shown) in the first control unit 201, the first control unit 201 and the volatile memory are unwantedly reset when the digital ping is stopped by transmission of EPT (suspension). As a result, in the status confirmation (step S403) after reactivation, determination should be performed based on "11" representing that the polling processing has been performed and the NFC tag has been detected but determination is performed based on "00" as the reset status. This problem is solved by storing the NFC-related information in the second control unit 210 that is supplied with power from the battery 207 and is not reset by the stop of the digital ping. Note that the second control unit 210 deletes the NFC-related information when the first control unit 201 refers to the stored NFC-related information (the detection status of the NFC tag by the reader/writer). This point will be described later with reference to FIG. 6.

Even if the NFC-related information is stored in another component that is not reset by the stop of the digital ping, it is possible to obtain the same effect. For example, the NFC-related information may be stored in a nonvolatile memory (not shown). The nonvolatile memory may be implemented in the first control unit 201 or connected to the first control unit 201. Alternatively, the power transmitting apparatus 100 may store the NFC-related information. This is because the internal circuit of the power transmitting apparatus 100 is supplied with power from the power supply unit 307 and is thus not reset even by the stop of the digital ping. In this case, in the negotiation phase, the power transmitting apparatus 100 can notify the power receiving apparatus 102 of the NFC-related information.

Next, among the above-described three cooperative operations, [2] will be described with reference to the flowcharts of FIGS. 3 and 5. This operation is an operation when the power transmitting apparatus 100 has the function of detecting the NFC tag but no polling processing has been executed.

If the first control unit 201 receives, as a response to the general request packet (capability), a response representing that the power transmitting apparatus 100 includes the reader/writer (YES in step S402), the process advances to step S412. If the power transmitting apparatus 100 includes the reader/writer, the power receiving apparatus 102 may control not to execute polling but this embodiment implements a more preferable cooperative operation by switching an operation in accordance with the detection status of the NFC tag in the power transmitting apparatus 100. First, if the first control unit 201 determines that the power transmitting apparatus 100 includes the reader/writer, it determines whether the power transmitting apparatus 100 has executed polling (step S412). This determination processing can be implemented by inquiring of the power transmitting apparatus 100 about the NFC-related information and receiving the response to it from the power transmitting apparatus 100 in the negotiation phase. To do this, a packet (a packet for inquiring about the NFC-related information) for requesting information corresponding to bit0 and bit1 shown in FIG. 4 is transmitted to the power transmitting apparatus 100.

As the packet for inquiring about the NFC-related information, for example, among the packets defined by the WPC standard, a reserved packet or proprietary packet whose packet type is undefined can be defined. Alternatively, among general requests and specific requests defined by the WPC standard, a reserved packet or proprietary packet whose packet type is undefined may be used.

Upon receiving the inquiry about the NFC-related information, the third control unit 301 of the power transmitting apparatus 100 performs status confirmation by inquiring of the fourth control unit 309 whether NFC tag detection has been performed and about the result of the detection processing (steps S503 and S504). The third control unit 301 receives information representing the detection status described with reference to FIG. 4 from the fourth control unit 309, and transmits, as a response to the inquiry about the NFC-related information, a packet including the information to the power transmitting apparatus 100 using the third communication unit 304 (step S505).

Assume that the response from the power transmitting apparatus 100 is information ("00") representing that no polling has been executed and no NFC tag has been detected (NO in step S412). In this case, the first control unit 201 instructs the second control unit 210 to execute polling (step S406). Then, in the processes in step S407 and the subsequent steps described above, the second control unit 210 detects the NFC tag without interfering with the digital ping. Note that the arrangement in which if the power transmitting apparatus 100 has executed no polling (NO in step S412), the power receiving apparatus 102 immediately executes polling has been explained but the present disclosure is not limited to this. If NO is determined in step S412, the first control unit 201 may execute the processes in step S403 and the subsequent steps.

Furthermore, following the inquiry about the NFC-related information, the first control unit 201 may transmit, to the power transmitting apparatus 100, a packet representing that the first control unit 201 performs processing (that is, polling) for detecting the NFC tag. Among the packets defined by the WPC standard, a reserved packet or proprietary packet whose packet type is undefined can be defined as a packet representing an intention of performing NFC detection processing by the self-apparatus. For example, among the general requests and specific requests defined by the WPC standard, a reserved packet or proprietary packet whose packet type is undefined may be used.

If the power transmitting apparatus 100 receives, from the power receiving apparatus 102, the packet representing the intention of performing the NFC detection processing, it may not perform polling processing for a predetermined time (YES in step S506 and step S507). This can more reliably avoid a situation in which polling transmitted by the NFC 302 of the power transmitting apparatus 100 and that transmitted by the NFC 202 of the power receiving apparatus 102 interfere with each other. Assume here that the predetermined time is at least longer than a time taken to transmit polling and receive a response to it after the second control unit 210 receives the polling instruction.

Subsequently, among the above-described three cooperative operations, [3] will be described with reference to the flowchart of FIG. 3. This operation is an operation when the power transmitting apparatus 100 includes the reader/writer, and polling processing has been executed in the power transmitting apparatus 100.

Assume that a response, from the power transmitting apparatus 100, to the inquiry about the NFC-related information transmitted by the first control unit 201 is information ("10" in FIG. 4) representing that polling has been executed and no NFC tag has been detected (YES in step S412 and NO in step S413). In this case, the first control unit 201 determines to confirm that no NFC tag exists near the power transmitting apparatus 100, and ends the processing shown in FIG. 3, thereby executing wireless power transmission from the power transmitting apparatus 100 to the power receiving apparatus 102.

Assume that the response from the power transmitting apparatus 100 is information ("11" in FIG. 4) representing that polling has been executed and the NFC tag has been detected. In this case, the first control unit 201 determines to confirm that the NFC tag exists near the power transmitting apparatus 100, transmits EPT (NFC) to the power transmitting apparatus 100, and ends this processing (steps S412, S413, and S410). In this case, power transmission from the power transmitting apparatus 100 is stopped, and no wireless power transmission from the power transmitting apparatus 100 to the power receiving apparatus 102 is executed.

Note that the arrangement in which the first control unit 201 transmits EPT (NFC) in response to detection of the NFC tag to stop power transmission by the power transmitting apparatus 100 has been explained above but the present disclosure is not limited to this. For example, an arrangement in which a packet for requesting transmission of small power to the extent that the NFC tag is not damaged is transmitted to the power transmitting apparatus 100 instead of the EPT (NFC), and the battery 207 is charged with the power may be adopted.

Figure 6:
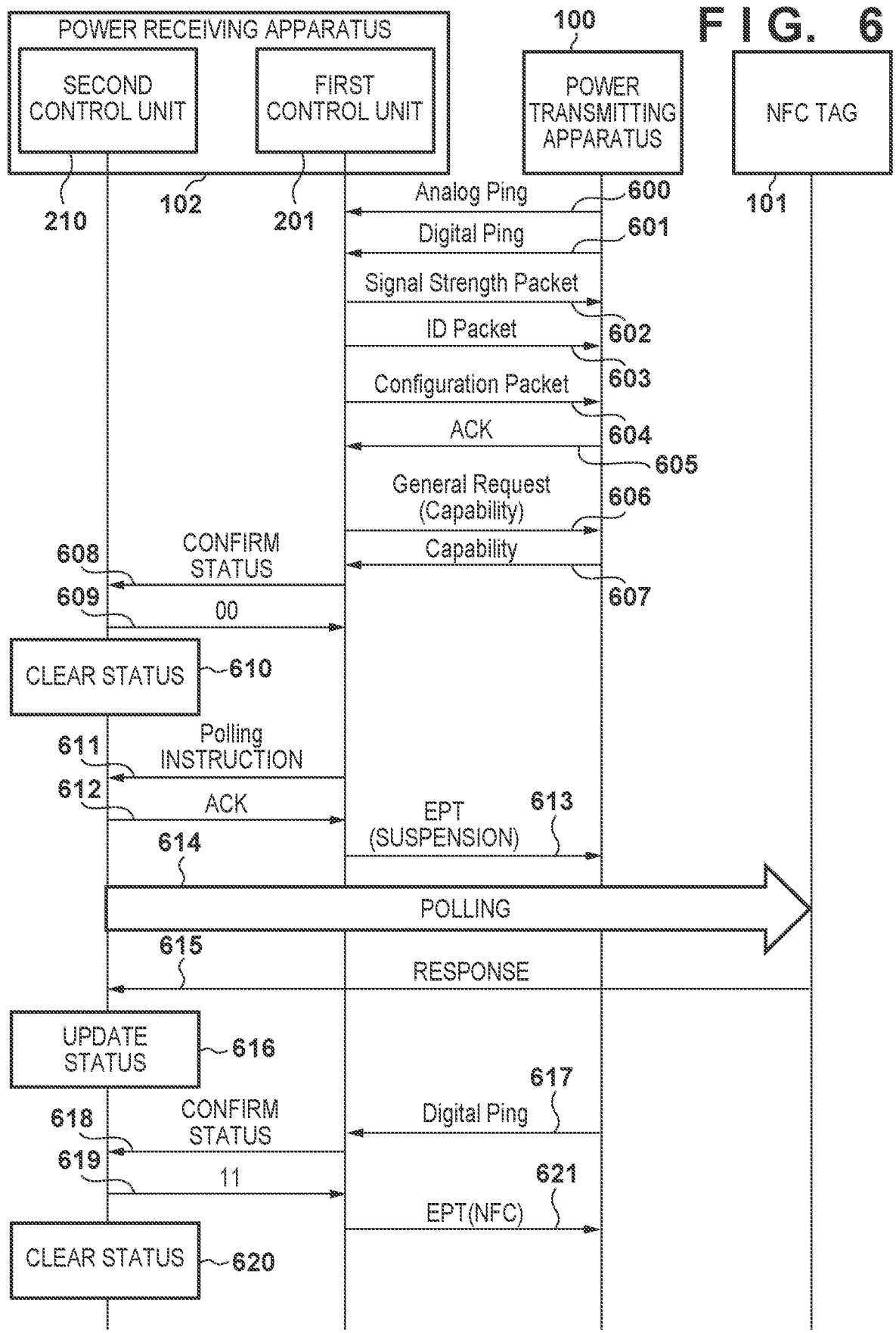
FIG. 6 is a sequence chart of the operation of a wireless charging system according to the embodiment.

Next, the operation sequence of wireless power transmission by the power transmitting apparatus 100 and the power receiving apparatus 102 that operate, as described above, according to this embodiment will be described with reference to FIG. 6. FIG. 6 is a sequence chart of the operation of a wireless charging system according to the embodiment. FIG. 6 exemplifies an operation sequence in the case of [1] among the above three cooperative operations.

After activation, the power transmission unit 303 of the power transmitting apparatus 100 starts a selection phase, and transmits an analog ping via the power transmitting coil 305 (600). The analog ping is a signal of small power for detecting an object existing near the power transmitting coil 305. The power transmitting apparatus 100 detects the voltage value or current value of the power transmitting coil 305 at the time of transmitting the analog ping. If the voltage is lower than a given threshold or the current value exceeds a given threshold, the power transmitting apparatus 100 determines that an object exists, and transitions to a ping phase. In the ping phase, the power transmitting apparatus 100 transmits a digital ping with power larger than that of the analog ping (601).

Upon receiving the digital ping, the first control unit 201 transmits a signal strength packet, an ID packet, and a configuration packet to the power transmitting apparatus 100 (602, 603, and 604). If the power transmitting apparatus 100 transmits an ACK to the configuration packet, and the power receiving apparatus 102 receives the ACK (605), the power transmitting apparatus 100 and the power receiving apparatus 102 transition to the negotiation phase. In the negotiation phase, the first control unit 201 transmits, to the power transmitting apparatus 100, a general request (capability) for inquiring whether the power transmitting apparatus 100 has the NFC tag detection function (606). The first control unit 201 receives, from the power transmitting apparatus 100, a capability including information representing whether the power transmitting apparatus 100 has the NFC tag detection function (607).

Assume here that the power transmitting apparatus 100 has no reader/writer function (no function of detecting the NFC tag). In this case, the first control unit 201 performs status confirmation concerning detection of the NFC tag for the second control unit 210 (608). Referring to FIG. 6, "00" representing that no polling processing has been executed and no NFC tag has been detected is received from second control unit 210 (609). The second control unit 210 responds to the status confirmation request, and then resets (deletes) the stored detection status (NFC-related information) of the NFC tag (610).

Upon receiving "00" from the second control unit 210 by performing the status confirmation, the first control unit 201 issues a polling instruction to the second control unit 210 (611). Upon receiving an ACK to the polling instruction from the second control unit 210 (612), the first control unit 201 transmits EPT (suspension) to the power transmitting apparatus 100 (613). If the power transmitting apparatus 100 temporarily suspends transmission of the digital ping in response to the EPT (suspension), the second control unit 210 performs polling processing (614). Upon receiving a response from the NFC tag (615), the second control unit 210 updates the detection status (NFC-related information) of the NFC tag, and stores it (616).

After that, the first control unit 201 is reactivated by receiving the digital ping again from the power transmitting apparatus 100 (617), and re-executes status confirmation for the second control unit 210 (618). Since, at this stage, the second control unit 210 stores the NFC-related information representing that polling processing has been executed and the NFC tag has been detected, the second control unit 210 transmits, to the first control unit 201, "11" (FIG. 4) as a response to the status confirmation (619). After transmitting the response to the status confirmation, the second control unit 210 clears (deletes) the stored NFC-related information (620). Upon receiving "11" as the detection status of the NFC tag, the first control unit 201 transmits EPT (NFC) to the power transmitting apparatus 100 to stop power transmission by the power transmitting apparatus 100 (621).

Note that as described above, after the second control unit 210 transmits the response to the status confirmation, that is, after the first control unit 201 refers to the NFC-related information, the NFC-related information is cleared (620). More specifically, after transmitting the detection status "11" to the first control unit 201, the second control unit 210 returns the detection status to "00". The reason for this is that the second control unit 210 needs to transmit, as the response (619), to the first control unit 201, information (that is, the latest NFC-related information) to the polling (614) performed immediately after the latest polling instruction (611) of the first control unit 201.

If the stored NFC-related information is not cleared and the status of the immediately precedingly executed polling is stored, the following failure is considered. Assume, for example, that at the time of receiving the status confirmation (608), information (that is, the status "10") representing that no NFC tag has been detected by the polling executed in the past is stored. If the second control unit 210 transmits "10" as the response (609), the first control unit 201 issues no polling instruction based on the flowchart shown in FIG. 3 (YES in step S405 and NO in step S409). In this case, if the NFC tag exists when the status confirmation (608) is requested, a failure that the NFC tag cannot be detected occurs. This failure can be avoided by clearing (setting "00") the stored status when the second control unit 210 responds to the status confirmation request from the first control unit 201. That is, the second control unit 210 stores, as the detection status, in a storing unit (for example, a nonvolatile memory), the result of detection executed in response to decision of execution of detection of the NFC tag 101 by the first control unit 201. If the first control unit 201 refers to the detection status stored in the storing unit, the second control unit 210 operates to delete the detection status from the storing unit.

While the digital ping is stopped by the EPT (suspension) (613), the power receiving apparatus 102 may be moved from the power transmitting apparatus 100 to another power transmitting apparatus (not shown). Since the first control unit 201 stops during the stop of the digital ping, the first control unit 201 cannot detect such movement.

A case in which polling is executed before the user removes the power receiving apparatus 102 from the power transmitting apparatus 100 and places it on another power transmitting apparatus immediately after transmitting EPT (suspension) will be considered. In this case, since no NFC tag exists nearby at the time of performing polling, the status concerning NFC is "10" (as a result of performing polling processing, no NFC tag has been detected). Assume that the power receiving apparatus 102 is placed on another power transmitting apparatus thereafter and the NFC tag exists near the other power transmitting apparatus. In this case, when the power receiving apparatus placed on the other power transmitting apparatus restarts its operation, the NFC-related information received from the second control unit 210 represents the detection status ("10"), and thus the first control unit 201 performs no polling and determines that no NFC tag exists. In this case, the second control unit 210 should notify the first control unit 201 of the status "00" concerning NFC but the status "10" is actually stored and a status mismatch occurs.

If the first control unit 201 of the power receiving apparatus 102 obtains the identification information of the power transmitting apparatus 100, and executes detection of the NFC tag by the NFC 202, the first control unit 201 confirms whether the pieces of identification information obtained before and after execution of the detection match each other. If the pieces of information do not match each other, the first control unit 201 deletes the detection status stored in the second control unit 210.

For example, every time the first control unit 201 receives the digital ping and is activated, it inquires about the identification information of the power transmitting apparatus 100. More specifically, among the general request packets defined by the WPC standard, a packet for inquiring about the identification information of the power transmitting apparatus is transmitted and the identification information of the power transmitting apparatus is received. The packet is, for example, a general request packet (power transmitter identification). The first control unit 201 compares the identification information obtained last time with that obtained this time. If the pieces of identification information do not match, an instruction to clear the NFC-related information is issued to the second control unit 210. As described above, it is possible to compare the pieces of identification information of the power transmitting apparatuses before and after transmission of EPT (suspension) (before and after the NFC tag detection operation), thereby solving the above-described failure.

For example, the power receiving apparatus 102 is placed on the power transmitting apparatus 100 with identification information "aa" before the power receiving apparatus 102 transmits (613) EPT (suspension), and is moved to another power transmitting apparatus (identification information "bb") during suspension of the digital ping. In this case, the pieces of identification information of the power transmitting apparatuses before and after the EPT (suspension) (after reactivation of the first control unit 201) do not match each other (aa≠bb), the status concerning NFC is cleared to "00". As a result, the first control unit 201 obtains "00" as the response (619) to the status confirmation (618), and can thus detect the NFC tag placed on the other power transmitting apparatus.

On the other hand, if the power receiving apparatus is placed on the power transmitting apparatus with the identification information "aa" before the EPT (suspension) (613), and is placed on the same power transmitting apparatus (identification information "aa") after suspension of the digital ping, the pieces of identification information before and after the EPT (suspension) match each other, and thus the NFC-related information is not cleared. Therefore, since the first control unit 201 receives the updated information (619) concerning NFC after the polling (614), it is possible to correctly detect the presence/absence of the NFC tag placed on the power transmitting apparatus.

This embodiment has explained only the use of the NFC reader/writer for NFC tag detection but the present disclosure is not limited to this. For example, in a product (for example, a smartphone) in which the power receiving apparatus 102 is implemented, the reader/writer may be used in another application (for an application other than the application of NFC tag detection).

Note that if the above-described NFC-related information is stored when the NFC reader/writer is used in another application, the following problem may arise. That is, if communication with the NFC tag is performed using the reader/writer in another application, the NFC-related information is updated to "11". As described above, the second control unit 210 does not clear the NFC-related information unless the response to the status confirmation is transmitted. Therefore, if the power transmitting apparatus 100 and the power receiving apparatus 102 come close to each other in this status, the first control unit 201 receives "11" as the response to the status confirmation (step S403) from the second control unit 210. As a result, the first control unit 201 unwantedly transmits EPT (NFC) to the power transmitting apparatus 100, and the battery 207 of the power receiving apparatus 102 cannot be charged even if no NFC tag exists near the power transmitting apparatus 100.

To solve this problem, the second control unit 210 stores, as an NFC-related status, a detection result obtained by polling immediately after a polling instruction to control wireless power transmission is received from the first control unit 201, and does not store an NFC-related status otherwise. This can solve the above problem without requiring the second control unit 210 to update the NFC-related information even if the reader/writer is operated in another application.

Other Embodiments

In the above-described wireless power transmission system, the wireless power transmission method is not particularly limited. For example, as the wireless power transmission method, a magnetic resonance method of transmitting power using coupling caused by the resonance of a magnetic field between the resonator (resonance element) of the power transmitting apparatus and the resonator (resonance element) of the power receiving apparatus can be used. Alternatively, a power transmission method using an electromagnetic induction method, an electric field resonance method, a microwave method, a laser, or the like can be used.

In addition, the power transmitting apparatus and the power receiving apparatus may each be, for example, an image input apparatus such as an image capturing apparatus (a camera, a video camera, or the like) or a scanner, or an image output apparatus such as a printer, a copying machine, or a projector. Furthermore, the power transmitting apparatus and the power receiving apparatus may each be a storage device such as a hard disk drive or a memory device, or an information processing apparatus such as a personal computer (PC) or a smartphone.

The flowchart shown in FIG. 3 starts when the first control unit 201 is powered on. Note that the processing shown in FIG. 3 is implemented when the first control unit 201 executes a program stored in the memory of the power receiving apparatus 102. Furthermore, the processing shown in FIG. 5 is implemented when the third control unit 301 executes a program stored in the memory of the power transmitting apparatus 100. At least some of the processes shown in the flowcharts of FIGS. 3 and 5 may be implemented by hardware. If some processes are implemented by hardware, for example, a dedicated circuit is automatically generated on an FPGA from a program configured to implement each step using a predetermined compiler. FPGA is an abbreviation for Field Programmable Gate Array. Alternatively, the processing may be implemented as hardware by forming a gate array circuit, like the FPGA.

According to the present disclosure, a preferable cooperative operation between a power receiving apparatus and a power transmitting apparatus in a wireless power transmission system when a reader/writer is implemented in the power receiving apparatus is implemented.

Embodiment(s) of the present disclosure can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present disclosure has been described with reference to exemplary embodiments, it is to be understood that the disclosure is not limited to the disclosed exemplary embodiments. The scope of the following claims is to be accorded the broadest interpretation so as to encompass all such modifications and equivalent structures and functions.

The invention claimed is:
1. A power transmitting apparatus, comprising:
a power transmitting unit configured to wirelessly transmit power;
a detection unit configured to execute detection processing for detecting an NFC tag for performing Near Field Communication (NFC), by a polling of NFC;
a receiving unit configured to receive a request for information on the power transmitting apparatus from a power receiving apparatus; and a sending unit configured to send, to the power receiving apparatus, information representing that the detection processing is supported by the power transmitting apparatus, information representing that the detection processing has not been executed by the power transmitting apparatus and information representing that no NFC tag is detected, after receiving the request, when the detection processing is supported by the power transmitting apparatus and the detection processing has not been executed.

2. The power transmitting apparatus according to claim 1, wherein the information representing that the detection processing is supported by the power transmitting apparatus, the information representing that the detection processing has not been executed by the power transmitting apparatus and the information representing that no NFC tag is detected are sent in a negotiation phase in which a negotiation regarding wireless power transmission is performed.

3. The power transmitting apparatus according to claim 1, wherein the receiving unit receives, from a power receiving apparatus, a request to limit transmission power after the sending unit sends, to the power receiving apparatus, information representing that the detection processing is supported by the power transmitting apparatus, information representing that the detection process has been executed by the power transmitting apparatus and information representing that an NFC tag is detected.

4. A communication method for a power transmitting apparatus that wirelessly transmits power, the method comprising:
   executing detection processing for detecting an NFC tag for performing Near Field Communication (NFC), by a polling of NFC;
   receiving a request for information on the power transmitting apparatus from a power receiving apparatus; and
   sending, to the power receiving apparatus, information representing that the detection processing is supported by the power transmitting apparatus, information representing that the detection processing has not been executed by the power transmitting apparatus and information representing that no NFC tag is detected, after receiving the request, when the detection processing is supported by the power transmitting apparatus and the detection processing has not been executed.

5. The communication method according to claim 4, wherein the information representing that the detection processing is supported by the power transmitting apparatus, the information representing that the detection processing has not been executed by the power transmitting apparatus and the information representing that no NFC tag is detected are sent in a negotiation phase in which a negotiation regarding wireless power transmission is performed.

6. The communication method according to claim 4, further comprising receiving, form a power receiving apparatus, a request to limit transmission power after information representing that the detection processing is supported by the power transmitting apparatus, information representing that the detection process has been executed by the power transmitting apparatus and information representing that an NFC tag is detected are sent to the power receiving apparatus.

7. A non-transitory computer-readable storage medium storing a program for causing a computer to execute a communication method for a power transmitting apparatus that wirelessly transmits power, the method comprising:
   executing detection processing for detecting an NFC tag for performing Near Field Communication (NFC), by a polling of NFC;
   receiving a request for information on the power transmitting apparatus from a power receiving apparatus; and
   sending, to the power receiving apparatus, information representing that the detection processing is supported by the power transmitting apparatus, information representing that the detection processing has not been executed by the power transmitting apparatus and information representing that no NFC tag is detected, after receiving the request, when the detection processing is supported by the power transmitting apparatus and the detection processing has not been executed.

* * * * *